March 24, 1931.  C. C. SPREEN  1,797,735
SEAL FOR COMPRESSORS
Filed April 22, 1927
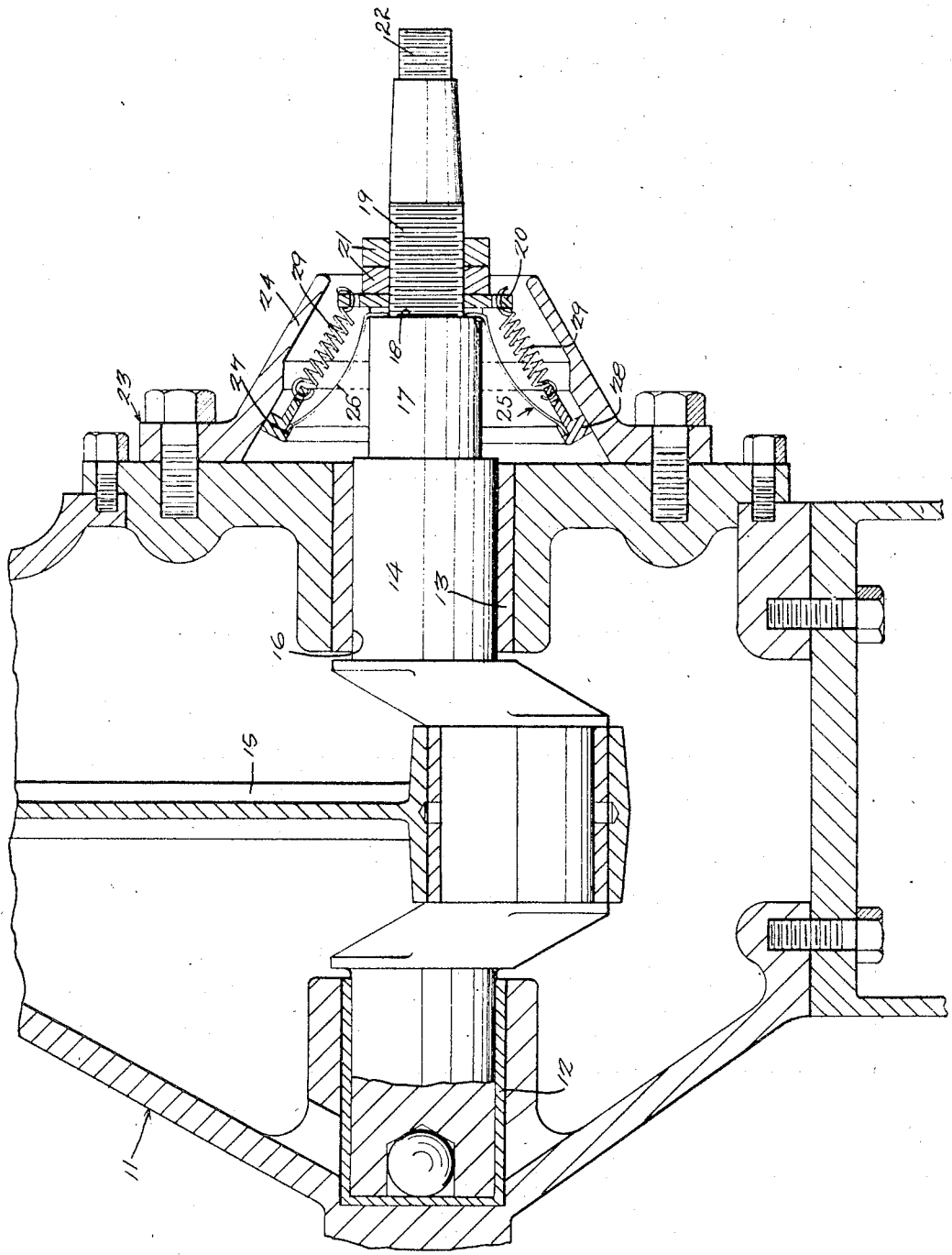
Charles C. Spreen
Inventor
By Waipue W. Hart
Attorney Patented Mar. 24, 1931

1,797,735

UNITED STATES PATENT OFFICE

CHARLES C. SPREEN, OF DETROIT, MICHIGAN

SEAL FOR COMPRESSORS

Application filed April 22, 1927. Serial No. 185,786.

My invention relates to seals for compressors, and particularly to means for sealing the drive shaft aperture in the casing of a refrigerant compressor, and the principal object of my invention is to provide new and improved means for this purpose. In the drawing accompanying this specification and forming a part of this application I have shown, for purposes of illustration, one form which my invention may assume, and in this drawing the single figure is a fragmentary central vertical section through a compressor showing the embodiment of my invention herein disclosed.

In the embodiment of my invention herein shown the lower portion of the compressor casing 11 is provided with a closed bearing 12 and an open-end bearing 13 arranged to jointly support a crank shaft 14 which receives between the bearings 12 and 13 the usual connecting rod 15, and which projects beyond the open-end bearing through a suitable aperture 16 in the casing 11, and is provided exteriorly of the casing 11 with a reduced extension 17 forming an annular shoulder 18 and adapted to receive on a screw-threaded section 19 a flange 20 held against the shoulder 18 by means of nuts 21 screw-threaded on the screw-threaded section 19, and on a further extension section 22 a suitable driving connection, not shown; and the casing 11 is provided about the aperture 16 with an annular seat member 23 carrying an annular frusto-conical casing seat 24 surrounding the aperture 16 and the crank shaft 14 passing therethrough.

Closing the aperture 16, particularly to prevent both the egress of refrigerant and the ingress of moisture, is a seal 25 herein shown as comprising a generally conical flexible annular diaphragm 26 having its smaller end disposed away from the casing 11 attached with the flange 20, and having its outer periphery disposed toward the casing 11 and attached to a base 27 carrying an attached friction ring 28 having a surface formed complementally frusto-conical to the frusto-conical casing seat 24 and held in rotary sealing engagement with the casing seat 24 by means of springs 29 tensioned between the base 27 and the flange 20.

From the above description it will be apparent to those skilled in the art that I have provided a seal provided with a substantially conical diaphragm having its smaller end disposed away from the casing fixedly sealed to the shaft, and having its larger end disposed toward the casing rotatably sealed to the casing by a seal between two complementary frusto-conical surfaces held together by springs urging the larger end of the seal outwardly from the compressor casing against the inwardly facing seat on the casing.

Under these circumstances it will be apparent to those skilled in the art that the embodiment of my invention herein shown accomplishes at least the principal object of my invention.

At the same time, it will also be obvious to those skilled in the art that the embodiment of my invention herein shown and described may be variously changed and modified without departing from the spirit of my invention or sacrificing the advantages thereof, and it therefore will be understood that the disclosure herein is illustrative only, and that my invention is not limited thereto.

I claim:

1. In a journal bearing seal, the combination with a casing having an aperture therethrough, a plate closing said casing aperture and provided with a shaft aperture, and a shaft extending through said plate aperture; of a seal structure comprising a frusto-conical seat member attached to said plate, a resilient frusto-conical diaphragm having one end rotatably sealed against said seat member and the other end sealed against said shaft, means for clamping the one end of said diaphragm to said shaft, and spring means for extending said diaphragm toward the inner side of said seat member.

2. In combination with a casing having an aperture, a plate closing said casing aperture and provided with a shaft aperture, and a shaft extending through said plate aperture; of a seal structure comprising a frusto-conical seat member attached to said plate, a resilient frusto-conical diaphragm provided at the larger end with a frusto-conical bearing ring rotatably sealed against said seat member, the smaller end of said diaphragm being clamped against said shaft, and spring means maintaining said bearing ring against the inner side of said seat member.

3. In combination with a casing having an aperture, a plate closing said casing aperture and provided with a shaft aperture, and a shaft extending through said plate aperture, said shaft having a reduced portion forming a shoulder; of a seal structure comprising a frusto-conical seat member attached to said plate, a resilient frusto-conical diaphragm rotatably sealed at one end against said seat member and clamped against said shaft to rotate therewith, a disk upon the reduced portion of said shaft, screw-threaded means for sealing said diaphragm against said shaft, and coil spring means intermediate said disk and said seat member for maintaining such members in operative relation.

4. In combination with a casing having an aperture, a plate closing said casing aperture and provided with a shaft aperture, and a shaft extending through said plate aperture; of a seal structure comprising a frusto-conical seat member attached to said plate, a frusto-conical diaphragm, a frusto-conical bearing ring attached to the larger end of said diaphragm and seating against the inner side of said seat member, means for sealing the smaller end of said diaphragm against said shaft, said means including a disk and screw-threaded means clamping said disk against the shoulder on said shaft, and springs attached to said bearing ring and said disk for maintaining said bearing ring in rotatable frictional engagement with said seat member.

In testimony whereof I hereunto affix my signature.

CHARLES C. SPREEN.